(12) United States Patent
Avolio (10) Patent No.: US 11,247,742 B2
(45) Date of Patent: Feb. 15, 2022

(54) ARTICLE ATTACHMENT APPARATUS, SYSTEM AND METHOD

(71) Applicant: Christopher Avolio, Los Angeles, CA (US)

(72) Inventor: Christopher Avolio, Los Angeles, CA (US)

( * ) Notice: Subject to any disclaimer, the term of this patent is extended or adjusted under 35 U.S.C. 154(b) by 0 days.

(21) Appl. No.: 16/992,717

(22) Filed: Aug. 13, 2020

(65) Prior Publication Data

US 2021/0024159 A1 Jan. 28, 2021

Related U.S. Application Data

(63) Continuation of application No. 16/133,627, filed on Sep. 17, 2018, now Pat. No. 10,793,216.

(60) Provisional application No. 62/559,536, filed on Sep. 16, 2017.

(51) Int. Cl.
| | |
|---|---|
| *B62J 7/08* | (2006.01) |
| *F16B 1/00* | (2006.01) |
| *F16B 2/08* | (2006.01) |
| *B62J 9/22* | (2020.01) |
| *B62H 5/00* | (2006.01) |

(52) U.S. Cl.
CPC . *B62J 7/08* (2013.01); *B62J 9/22* (2020.02); *F16B 1/00* (2013.01); *F16B 2/08* (2013.01); *B62H 2005/008* (2013.01); *F16B 2001/0028* (2013.01)

(58) Field of Classification Search
CPC ..... B62H 2005/008; B62J 9/005; B62J 11/00; B62J 7/08; F16B 2001/0028; F16B 1/00; Y10S 224/935

USPC ...................... 224/426, 463, 917, 917.5, 935
See application file for complete search history.

(56) References Cited

U.S. PATENT DOCUMENTS

| | | | |
|---|---|---|---|
| 603,018 A | 4/1898 | Beck | |
| 4,176,770 A | 12/1979 | Griggs et al. | |
| 4,759,963 A | 7/1988 | Uso, Jr. et al. | |
| 5,251,777 A * | 10/1993 | McMahon | B62J 11/00 220/480 |
| 5,395,018 A * | 3/1995 | Studdiford | B62H 5/00 224/420 |
| 5,458,308 A | 10/1995 | Lin | |

(Continued)

OTHER PUBLICATIONS

OopsMark, "U-Lock Holster", retrieved from http://www.oopsmark.ca/products/u-lock-holster?variant=644312901, on Sep. 18, 2018, pp. 1-2.

(Continued)

*Primary Examiner* — Adam J Waggenspack
(74) *Attorney, Agent, or Firm* — One LLP (57) ABSTRACT

An apparatus for securing articles to structural members includes a main strap assembly having at least three distinct portions configured for forming a secure loop by attachment of at least one of the portions to another of the portions. The apparatus further includes a pair of parallel ancillary strap assemblies attached transversely to the main strap assembly. Each of the pair is attached to a respective one of ancillary releasable engagement mechanisms at an end thereof, for forming an engageable loop. The ancillary strap assemblies can be used to attach the main strap assembly parallel to an elongate structural member. The secure loop of the main strap assembly can be used for securing a heavy article to a bicycle frame, or the like.

16 Claims, 8 Drawing Sheets

(56) References Cited

U.S. PATENT DOCUMENTS

| | | | |
|---|---|---|---|
| 5,464,135 A | 11/1995 | Studdiford | |
| 5,669,536 A | 9/1997 | Wang | |
| 5,806,730 A | 9/1998 | Deno | |
| 5,833,188 A | 11/1998 | Studdiford et al. | |
| 6,032,841 A * | 3/2000 | Johnson | A45F 5/02 |
| | | | 224/148.6 |
| 6,138,882 A | 10/2000 | Buettner | |
| 6,318,687 B2 | 11/2001 | Trana et al. | |
| 6,431,422 B1 | 8/2002 | Moore et al. | |
| 6,843,456 B1 | 1/2005 | Hajianpour | |
| 7,273,221 B2 | 9/2007 | Ockenden | |
| 7,404,534 B1 | 7/2008 | Hajianpour | |
| 7,654,550 B2 | 2/2010 | Chuang | |
| 8,083,112 B2 * | 12/2011 | Kuo | E05B 67/38 |
| | | | 224/425 |
| 8,727,914 B2 | 5/2014 | Sells | |
| 8,833,596 B2 | 9/2014 | Sanguinet et al. | |
| 9,079,626 B2 | 7/2015 | Zuraski et al. | |
| 10,035,552 B2 | 7/2018 | Zuraski et al. | |
| 2008/0142674 A1 | 6/2008 | Dang et al. | |
| 2008/0296325 A1 * | 12/2008 | Tepper | A45F 5/00 |
| | | | 224/148.6 |
| 2010/0059565 A1 | 3/2010 | Cote | |
| 2010/0072238 A1 * | 3/2010 | Pape | B62J 11/00 |
| | | | 224/425 |
| 2013/0214019 A1 * | 8/2013 | Wu | B62J 11/00 |
| | | | 224/413 |
| 2013/0248571 A1 | 9/2013 | Jones | |
| 2014/0021231 A1 | 1/2014 | Riat | |

OTHER PUBLICATIONS

Just Kryptonite, "Kryptonite EZ-Bracket Kit", retrieved from http://www.justkryptonite.com/ez-bracket_kit, on Sep. 18, 2018, p. 1.

* cited by examiner

ARTICLE ATTACHMENT APPARATUS, SYSTEM AND METHOD

PRIORITY CLAIM

The present application is a continuation of U.S. patent application Ser. No. 16/133,627, filed Sep. 17, 2018, which claims priority to U.S. Provisional Patent Application No. 62/559,536 filed Sep. 16, 2017, the disclosures of both of which are incorporated herein in their entireties by reference.

FIELD

The present application relates to an attachment apparatus, system and method for securely attaching heavy objects, such as U-locks, relative to lightweight mobile frames, such as bicycle frames.

BACKGROUND

A common problem encountered by commuters or other persons travelling by bicycle, motorcycle, or other open/relatively small forms of transportation is that it is often necessary to carry one or more relatively large, heavy and/or awkwardly shaped locks or chains in order to provide means to securely store the means of transportation, as well as helmets, pumps and/or other associated equipment, at a site remote from the user when not in use. U-locks are currently one of the safest and most durable forms of securing a bicycle, for example, but they are relatively large and heavy, and have an awkward shape, such that they are difficult to transport when not in use. For most bicycle users, the easiest and safest way to transport a U-lock is to attach it to the bicycle in a manner that supports the lock without interfering with the action of the user riding the bicycle. Information relevant to attempts to alleviate such problems by providing means to attach a bicycle lock, pump or other equipment to a bicycle or user can be found in the following references: U.S. Pat. Nos. 5,458,308; 6,318,687; 6,431,422; 7,273,221; 7,654,550; 8,833,596; 9,079,626; and U.S. Patent No. Application No. 20080142674.

Prior approaches for attaching U-locks to bicycles also include strap-type holsters, typically a leather or fabric case for carrying a the lock on a bike (or on the user/rider) such as the 'Mini U-lock Holster' by CaseSimpl or U-Lock holster by Oopsmark (http://www.oopsmark.ca/products/u-lock-holster?variant=644312901), and bracket-type supports such as the Kryptonite EZ-Bracket Kit' by Just Kryptonite (http://www.justkryptonite.com/ez-bracket_kit).

However, each of these prior products or solutions suffers from one or more of the following disadvantages: the apparatus or system must be attached to the lock; the apparatus or system is difficult to install; installation requires tools; the use of the apparatus or system is limited to certain styles or sizes of locks; it is time consuming to remove or attach the apparatus or system to a bicycle or other desired location; the holder does not secure the lock well, allowing movement during transit; use of the apparatus or system requires additional components attached to the lock or bicycle, such that a user is required to purchase other brand-specific products (e.g. cannot be used with other manufacturer's locks or holding mechanisms); the apparatus or system is too weak for its intended purpose; the apparatus or system is not durable or breaks easily, for example by concentrating most or all of the weight of the lock on a single point; the lock is hard to attach to or remove from the bike using the apparatus/system; the apparatus or system can become loose during use, such that the lock can move and interfere with the user trying to ride the bicycle; the apparatus or system has many and/or expensive components, such that it is relatively complicated and/or costly to produce; the apparatus or system is not adjustable and thus, for example, cannot accommodate locks of varying shapes or dimensions or other types of equipment; the apparatus or system is not versatile, for example, can only be attached to one point on the bicycle or user, such as the back of the seat, to a basket or to a belt on a user/rider; and the apparatus or system cannot be readily used with accessories, including for example storage compartments or tool kits. Thus, consumers need improved ways to attach and transport bicycle locks without interfering with the rider when the bicycle is in use, particularly bicycle lock holsters that are simple and cost-effective to make and use, and which can be used with most if not all types of locks available.

It would be desirable, therefore, to develop new apparatus, systems and methods for attaching heavy objects to lightweight mobile frames, such as bicycle frames, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, an apparatus for securing articles to structural members may include a main strap assembly. The main strap assembly may be, or may include, an elongate webbing (e.g., a strap) having at least three distinct portions configured for forming a secure loop by attachment of at least one of the portions to another of the portions. The apparatus may further include a pair of parallel ancillary strap assemblies attached transversely to the main strap assembly, each of the pair attached to a respective one of ancillary releasable engagement mechanisms at an end thereof. The main strap assembly, with or without further details as described herein, may provide a means for forming a secure adjustable loop of webbing material by releasable attachment of the webbing material to itself. The pair of parallel ancillary strap assemblies, with or without further details as described herein, may provide a means for releasable secure attachment of the secure adjustable loop parallel to an elongate structural member, coupled to the webbing material.

In aspects of the apparatus, the at least three distinct portions of the main strap assembly may be, or may include, a proximal portion, an intermediate portion and a distal portion. The main releasable engagement mechanism may be attached to the main strap assembly at an end of the proximal portion. The releasable engagement mechanism may be, or may include, a ring. The intermediate portion comprises a piece of loop material for hook-and-loop engagement having its engagement side oriented towards a back side of the main strap. The distal portion may be, or may include, a piece of hook material for hook-and-loop engagement having its engagement side oriented towards the back side of the main strap. The proximal portion may be, or may include, a rubberized webbing having a rubberized side oriented towards the back side of the main strap.

In other aspects of the apparatus, the elongate webbing may be free of attachment materials on a front side of the main strap assembly. The elongate webbing may be stitched to any one or more of the piece of loop material or the piece of hook material. It may also be stitched to the rubberized webbing. Each of the three distinct portions may be of equivalent length.

In other aspects of the apparatus, the ancillary releasable engagement mechanisms each comprise a ring. Each of the pair of parallel ancillary strap assemblies may be, or may include, a proximal portion attached to the ring and a distal portion distinct from the proximal portion. The proximal portion may be, or may include, a piece of loop material and the distal portion may be or include a piece of hook material. Each of the pair of parallel ancillary strap assemblies may be oriented with the engagement side of the piece of loop material and the engagement side of the piece of hook material may be oriented toward a front side of the main strap assembly. Each of the proximal portion and the distal portion may be of equivalent length.

In a related aspect, a method for attaching an article to a bicycle frame using the aforementioned apparatus may include attaching the main strap assembly parallel to an elongate structural member of the bicycle frame; inserting the article through the secure loop; and adjusting the main strap until the article is snugly engaged in the secure loop. The article may be a U-lock. The method may further include securing a free portion of the article by an additional strap assembly.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and apparatus are shown in block diagram form to facilitate describing these aspects.

The innovation disclosed herein includes for example apparatus, systems and methods for to reversibly attaching and detaching a bicycle lock or other related equipment to/from a bicycle, motorcycle, scooter or other small/portable means of transportation.

One embodiment of the invention is a bicycle lock holster that can be readily attached to and removed from a bicycle and which can provide an easy an effective means for transporting a bicycle U-lock while a bicycle is in use without interfering with the rider using that bicycle The components of this embodiment may include for example a strap affixed to itself to form an oval loop effective to store an object at a storage site, one or more additional straps for attaching the loop to the storage site, including for example a bicycle frame, and one or more additional straps to further attach the object to a storage site.

This embodiment can provide one or more of the following improvements: it can be relatively easy to attach the apparatus to a bicycle or other location to provide storage for a U-lock or other piece of equipment; it can used to provide extra storage to any site; it can be attached to a number of different locations on a bicycle, including for example one or more handle bars, top tubes, seat tubes, rear triangles, and down tubes with a very simple fastener (i.e. without tools); locks of all sizes can fit due to the adjustable nature of the fastening strap; and the two rear straps can be fully adjustable and thus allow the apparatus to securely attach to all sizes of tubes.

One of this embodiment's exceptional characteristics lies in the adjustability of the fastening loop in that it can be attached to multiple locations on, and sizes of, a bicycle frame; and the adjustability of the loop's size (where the lock slides into) thereby accommodating a variety of locks or other equipment having variable dimensions, including for examples U-locks that have different sizes and shapes.

Materials suitable for fabricating one or more straps according to the invention include for example leather and synthetic materials such as nylon, vinyl, denim, cotton, polyester, plastic, and poly-pro.

Materials suitable for affixing one or more straps according to the invention, to itself, include for example Velcro®, buckle, thread, adhesive, hooks, and clamps.

Releasable engagement mechanisms suitable for affixing one or more straps around an object may include, for example, plastic or metal buckles or rings, Ladderlock buckles, strap adjusters, clips, and tri-glide slides. Rectangular rings are shown in the depicted embodiment, as suitable for low cost, simplicity, durability, ease of use, and superior function with an assembly of the depicted configuration. However, one of ordinary skill may substitute buckles or rings of other types and adapt the strap assembly for use with the alternative buckles or rings.

In embodiments of the apparatus, a first material is made long enough to wrap around a lock and to be secured. The material may include a flexible strap (e.g., woven webbing) or similar material. The strap may be fed through a ring or other releasable engagement mechanism and folded back on top of itself, illustrated in FIGS. 6A-B. The strap may be assembled to an affixing material to secure the remaining strap on top of itself, including without limitation hook and loop fabric. Affixing the strap to itself creates a loop (e.g., a closed band of webbing) wherein a lock or other object of multiple sizes and shapes/dimensions can be inserted into or removed from such as, for example, being slid in and out of. The adjustability of the length of the strap can make it possible to fit different sizes, shapes, and styles of objects in the loop including, but not limited to U-locks, cable locks, chain locks, water bottles, tools and bicycle pumps into the loop.

Intersecting the strap that wraps around the lock can be one or more securing apparatus. This securing apparatus may have one or more straps which can be fed through a ring or other releasable engagement mechanism as illustrated in FIG. 5. The remaining strap can be affixed, for example, to itself via an affixing method, of which without limitation, can be a snap clasp, hook and loop, or Velcro®. Further details are described in connection with FIGS. 1-10 below.

Figure 1:
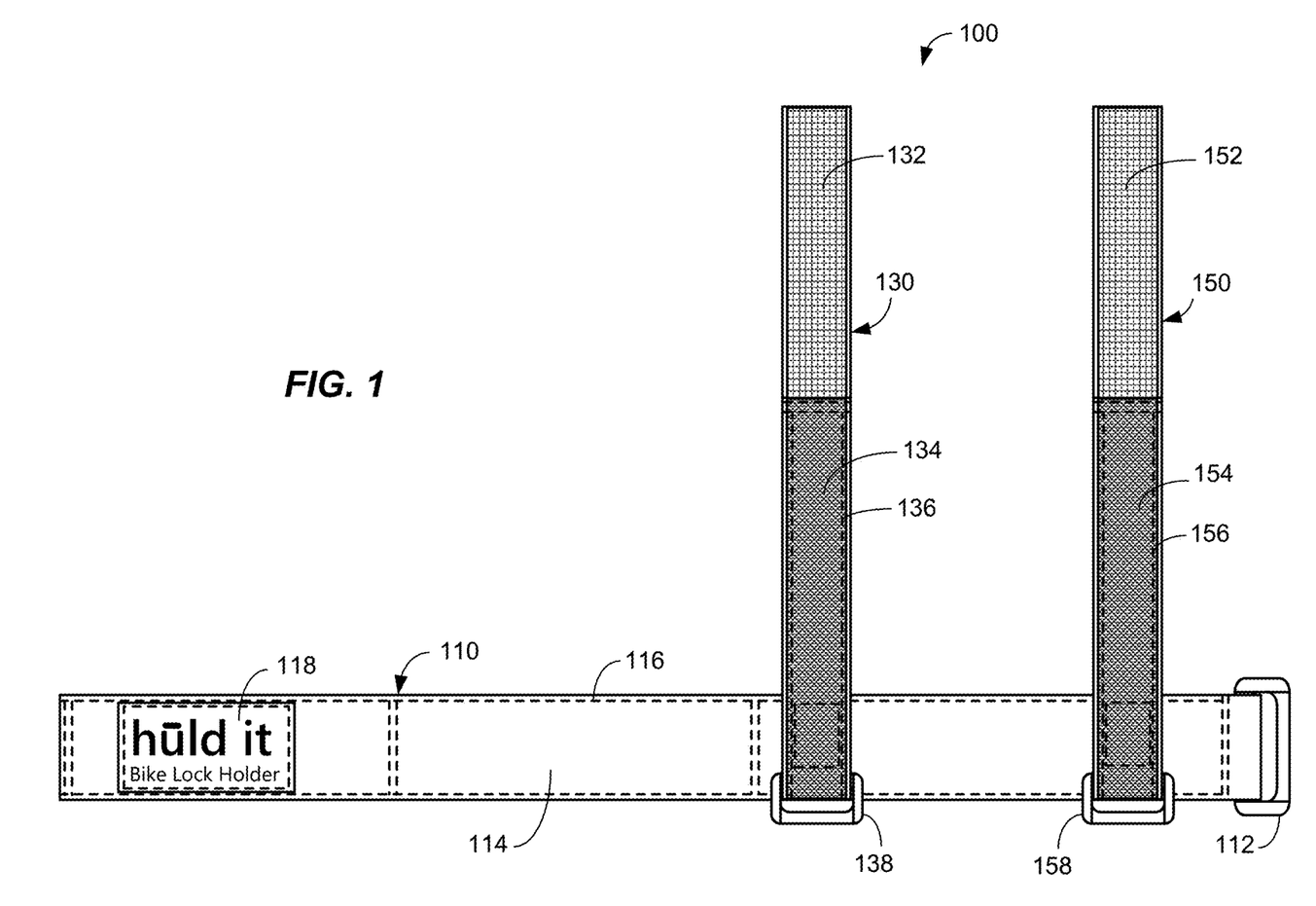
FIG. 1 is a plan view illustrating a front side of an apparatus for securing an article to a frame, when laid out flat.
Figure 2:
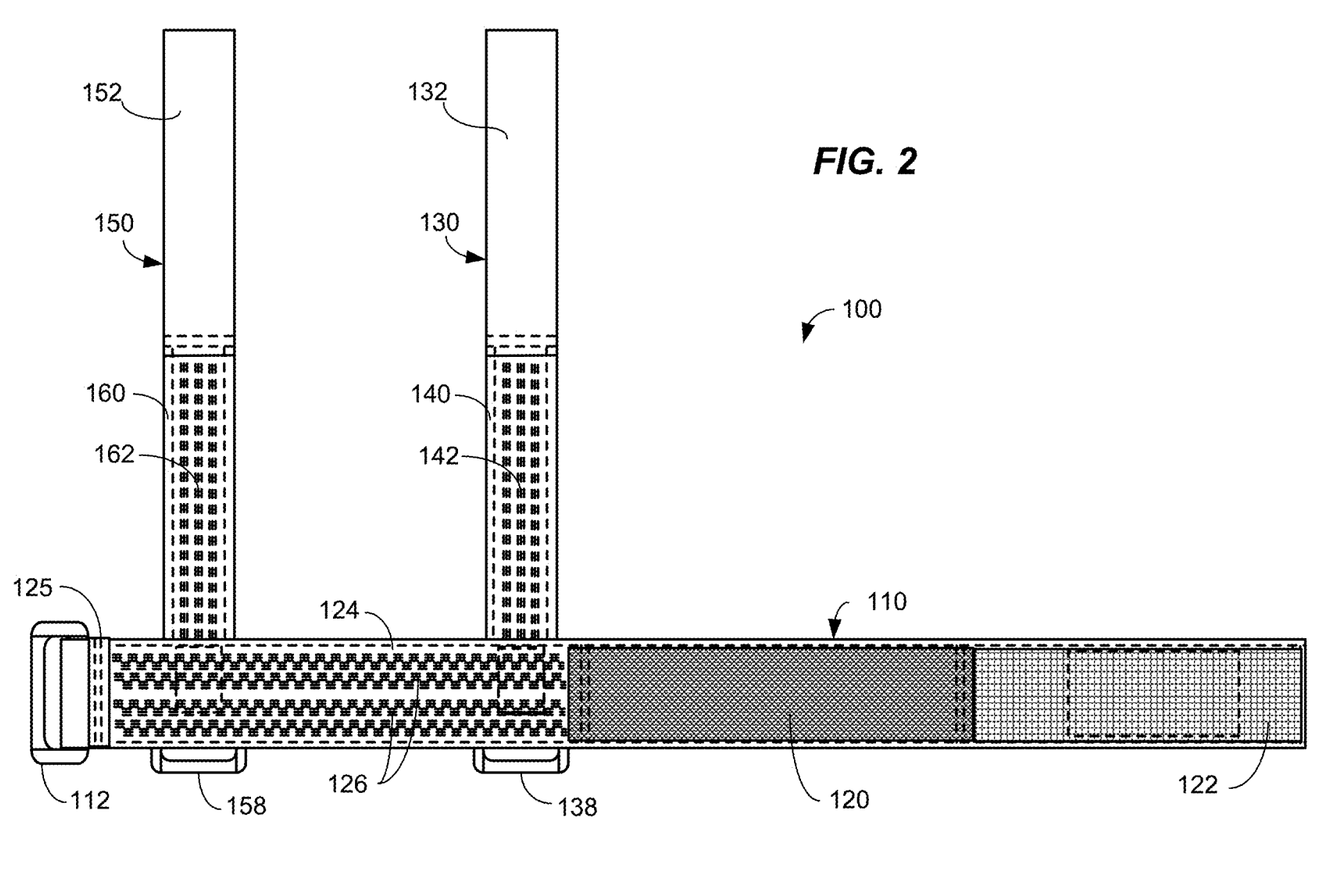
FIG. 2 is a plan view illustrating a back side of the apparatus shown in FIG. 1.

Referring to FIGS. 1-2, an apparatus ("strap assembly") 100 for securing an article to a frame for example a U-lock to a bicycle frame is shown laid out flat. FIG. 1 shows a first ("front") side and FIG. 2 shows a reverse ("back") side, both drawn at one-half scale and show an embodiment useful for bicycles. The depicted design is made to attach to tubular bicycle frames and may be resized and reconfigured by one of ordinary skill for use with frames of larger or smaller sizes.

The strap assembly 100 may include component assemblies, for example a main strap assembly 110 for securing a U-lock or other heavy article and two or more ancillary strap assemblies 130, 150 attached perpendicular to the main strap assembly 110, for securing the main strap assembly to a frame. The main strap assembly, with or without further details as described herein, may provide a means for forming a secure adjustable loop of webbing material by releasable attachment of the webbing material to itself. The main strap assembly may include, for example, a continuous elongate piece of woven webbing 114 (for example, nylon, polyester, or natural fiber webbing) secured at a first end thereof to a rectangular ring 112 or plastic or metal material, which serves as a releasable engagement mechanism. An identity tag 118 may be attached to the webbing 114 distal to the rectangular ring 112, for decorative, marketing, or personal identification purposes. Stitching 116 is indicated throughout FIG. 1-4 as dashed lines. Hidden lines are not shown for illustrative simplicity, but stitching is shown around the perimeter of most woven or web components and indicates the position of attached hidden components. While stitching provides a durable and flexible attachment for the depicted components, other fasteners may also be suitable, for example, rivets, staples or adhesive.

The main strap assembly may include at least three distinct portions configured for forming a secure loop by attachment of at least one of the portions to another of the portions. The at least three distinct portions of the main strap assembly may be, or may include, a proximal portion, an intermediate portion and a distal portion. Several different components 120, 122, 124 may be attached to the portions at a reverse or "back side" of webbing 114, as shown in FIG. 2. A first "loop" component 120 attached to and making up part of the intermediate portion may be, or may include, a rectangular piece of non-woven loop material for use in a hook-and-loop fastener attached to a woven backing, the piece 120 being about one-third as long as the main strap assembly 110. The loop component may be attached to the middle of the base webbing 114, between a piece of corresponding "hook" component 122 of a hook-and-loop fastener and a piece of rubberized reinforcement webbing 124, each likewise about one-third as long as the main strap assembly 110. The hook component 122 may be attached to or form a part of the distal portion, distal to a rectangular ring 112 or other releasable engagement mechanism. The rubberized reinforcement webbing 124 may be attached to or form a part of the proximal portion, proximal to the rectangular ring 112. The rubberized reinforcement webbing 124 may include strands of rubber-coated or rubber threads 126 woven into itself and exposed on the reverse as shown in FIG. 2, for providing grip when the main strap assembly is attached to a tubular frame or the like. The friction of the rubberized webbing 124 helps resist motion of the attached article during transit and maintain a stable configuration for the safety and convenience of the rider. A finishing piece 125 may be attached to cover an exposed end of the webbing 124.

Referring again to FIGS. 1 and 2, two or more parallel ancillary strap assemblies 130, 150 each may be, or may include, a proximal portion attached to the ring and a distal portion distinct from the proximal portion. The proximal portion may be, or may include, a piece 134, 154 of non-woven loop material attached to a woven webbing and secured to a respective one of the rectangular rings 138, 158. Again, stitching 136, 156 is illustrated with dashed lines and hidden edges are omitted for illustrative simplicity. The pair of parallel ancillary strap assemblies, with or without further details as described herein, may provide a means for releasable secure attachment of the secure adjustable loop parallel to an elongate structural member, coupled to the webbing material.

Each of the loop pieces 134, 154 may be attached to a backing of rubberized webbing 140, 160 that includes woven rubber-coated or rubber threads 142, 162. The rubberized webbing 140, 160 may each be similar to but smaller than the rubberized web 124 of the main strap assembly 110. Each of the loop pieces 134, 154 may further be attached to the distal portion. Each distal portion may be, or may include, a piece 132, 152 of hook material for engaging with the loop material on a webbing distal from its respective rectangular ring 138, 158. Each distal portion may thus be configured for removably attaching to the loop pieces 134, 154 when securing the ancillary strap assemblies to a bike frame, handlebars, or the like. FIG. 1 shows the engagement hook sides of the hook pieces 132, 152, while FIG. 2 shows the reverse sides of these same pieces. The reverse side may be configured without hooks, for example, as a woven web.

Figure 3:
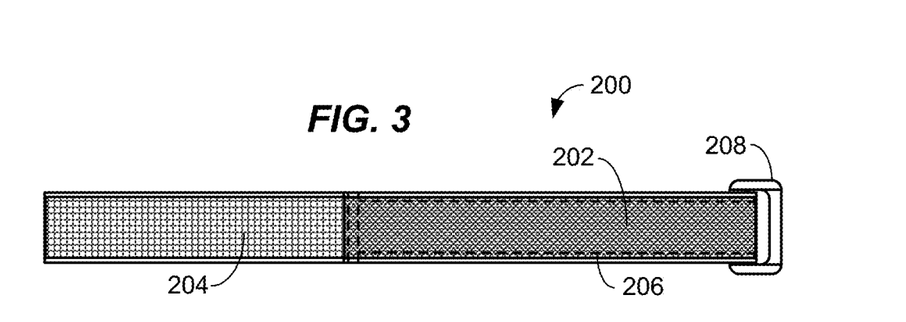
FIG. 3 is a plan view illustrating a front side of a secondary strap assembly, that when combined with the apparatus of FIGS. 1-2, provides a system for securing an article to a frame.
Figure 4:
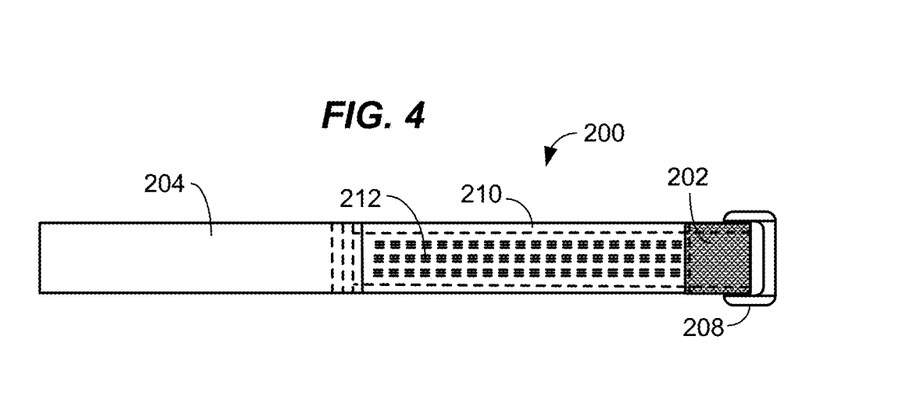
FIG. 4 is a plan view illustrating a back side of the secondary strap assembly of FIG. 3.
Figure 5:
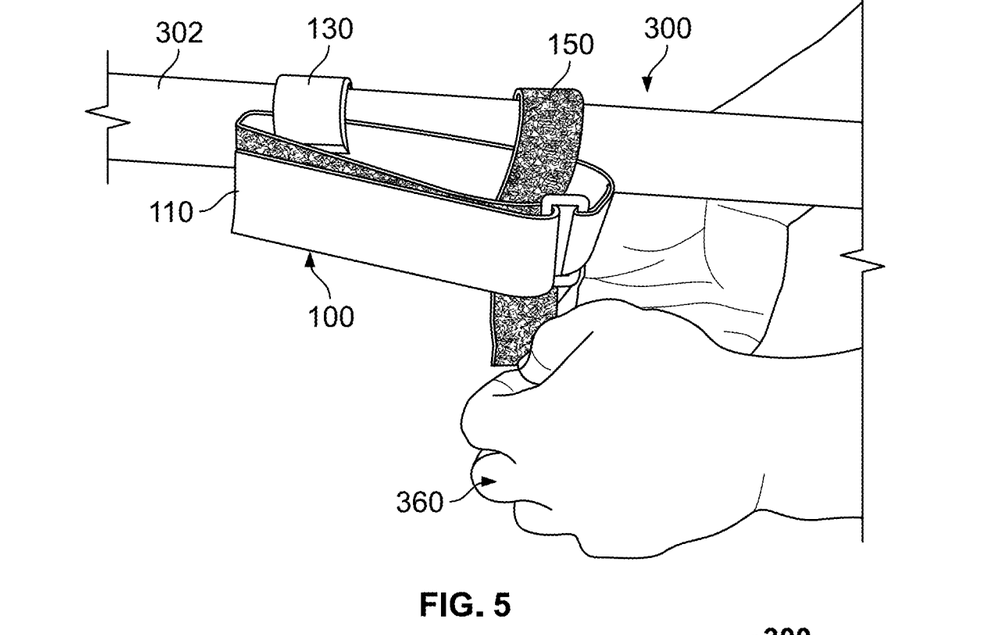
FIG. 5 is a line rendering of a photo illustrating the apparatus of FIGS. 1-2 during attachment to a bicycle frame.

An additional strap assembly 200 as shown in FIGS. 3-4 can be used to further secure the lock to the bicycle. The strap assembly 200 is drawn at one-half scale, sized and configured for use with a U-lock and bicycle frame. The assembly 200 may be constructed the same as or similarly to the ancillary strap assemblies 130, 150 shown in FIGS. 1-2. The additional strap assembly 200 may include a piece 202 of non-woven loop material attached to a woven webbing and secured to a rectangular ring 208 or other releasable engagement mechanism. Stitching 206 is illustrated with dashed lines and hidden edges are omitted for illustrative simplicity. The loop piece 202 may be attached to a backing of rubberized webbing 210 that includes woven rubber-coated or rubber threads 212. The loop piece 202 may further be attached to a corresponding piece 204 of hook material on a webbing distal from the rectangular ring 208. FIG. 3 shows the hook side of the hook material 204, while FIG. 4 shows the reverse side, which is configured without hooks. The illustrated configuration of the additional strap assembly 200 is useful for providing another point of attachment when securing a U-lock or other heavy article to a bike frame.

FIGS. 5-10 illustrate the strap assembly (apparatus) 100 and additional strap assembly 200 in use for securing a U-lock 350 to a bicycle frame 300, at different stages of an attachment process. FIG. 5 shows the assembly 100 with a first one of the ancillary straps 130 secure and the second strap 150 in process of being wrapped around the bike frame 300, and more particularly around an upper bar 302 of the frame 300. The user 360 has inserted an end of the ancillary strap 150 through the rectangular ring 158 and is about to pull the hook piece 152 back to engage the loop piece 154. In alternative mounting configurations, the strap assembly 100 may be attached to other tubular frame components, for example, handlebars, seat posts, lower bars, or vertical bars.

Figure 6A:
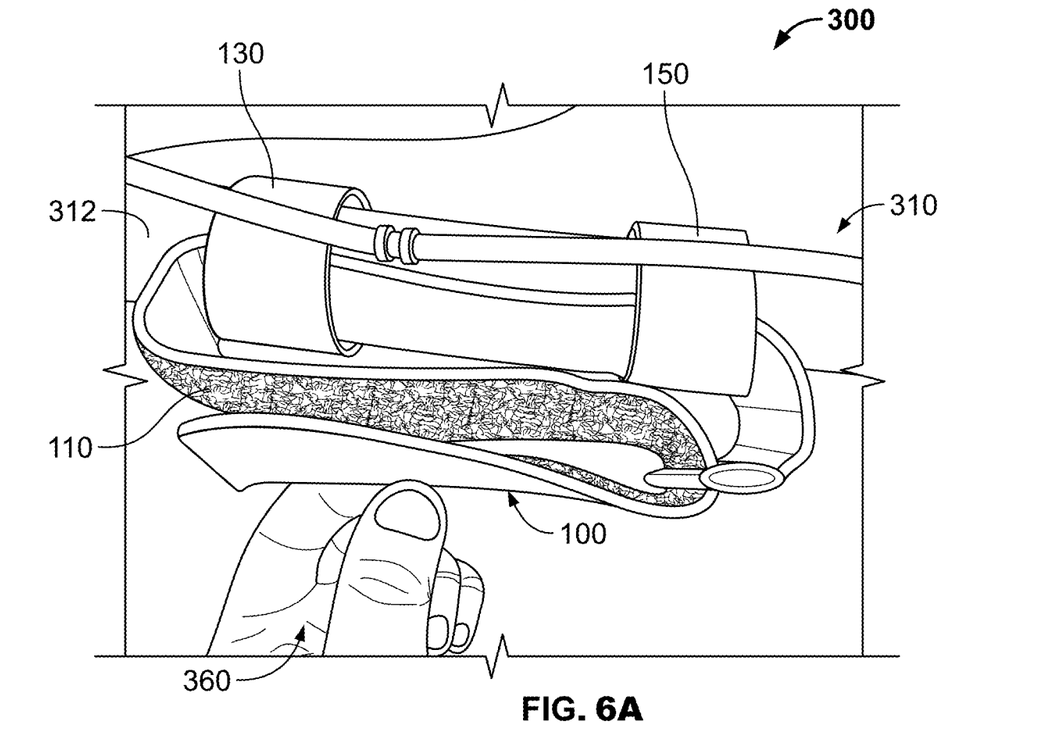
FIGS. 6A-B are line renderings of photos illustrating different views of the apparatus of FIGS. 1-2 after attachment to the frame.
Figure 6B:
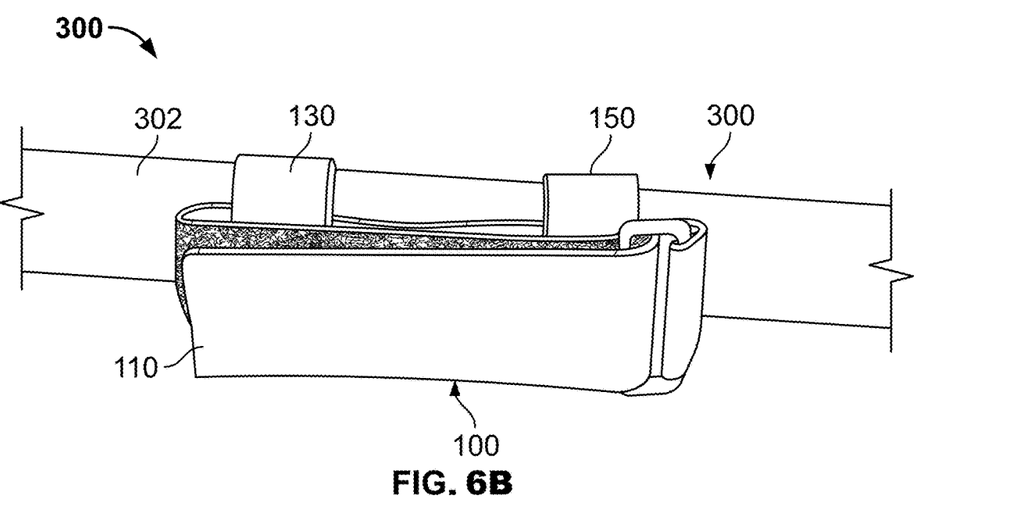
Figure 7:
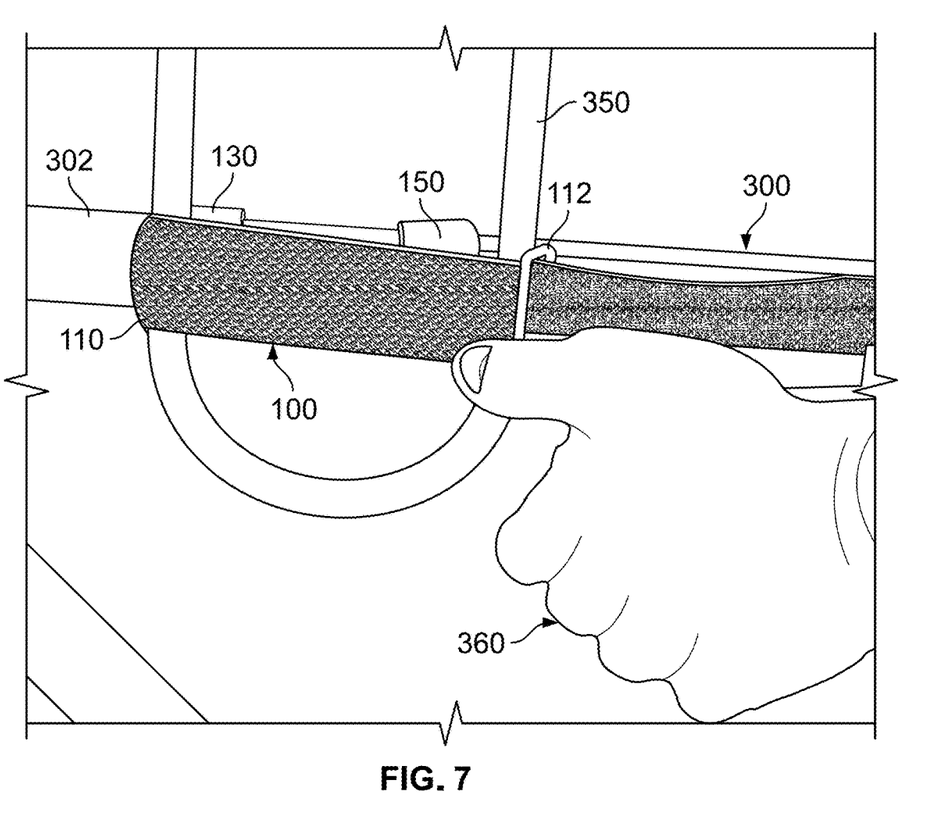
FIG. 7 is a line rendering of a photo illustrating the apparatus of FIGS. 1-2 during insertion of a U-lock, after attachment to the frame.

FIG. 6A shows a top view of the strap assembly 100 secured to an upper bar 312 of a different bike frame 310. The arrangement of the main strap 110 relative to the rectangular ring 112 is visible with the loop piece 120 not yet fully engaged with the hook piece 122. FIG. 6B shows a front view of the strap assembly secured to the upper crossbar 302 of the frame 300, with all the hoop-and-loop pieces fully engaged but without holding a U-lock or other article. The ancillary straps 130, 150 hold the main strap 110 to the frame 300, and the main strap is ready for use to hold a U-lock or other article. FIG. 7 shows the lower portion of a U-lock 350 inserted between a loop formed by the main strap 110 of the apparatus 100. The user 360 has loosened the main strap 110 by disengaging the loop piece 120 from the hook piece 122. The free end of the main strap 100 is passed through the rectangular ring 112 and is ready to be doubled back and secured.

Figure 8:
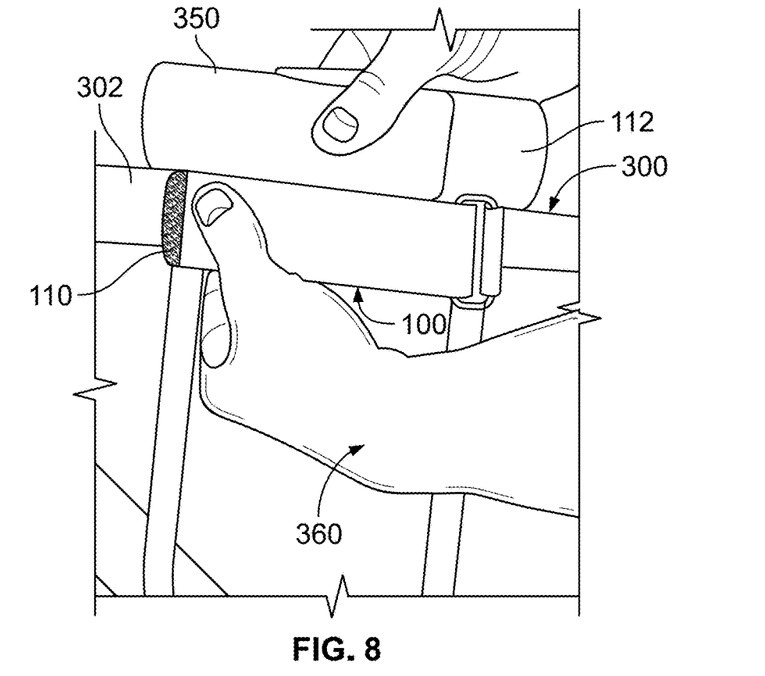
FIG. 8 is a line rendering of a photo illustrating the apparatus of FIGS. 1-2 after the U-lock is fully inserted.
Figure 9:
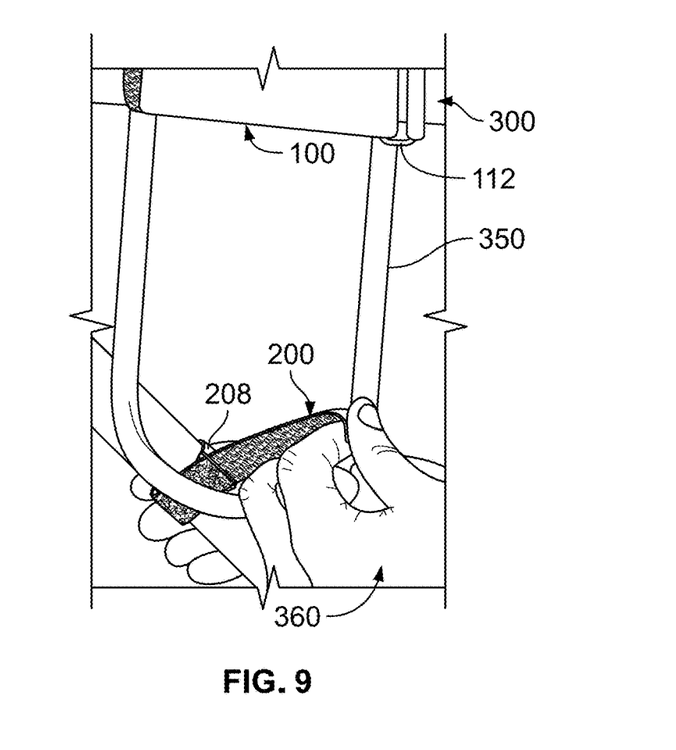
FIG. 9 is a line rendering of a photo illustrating the apparatus of FIGS. 1-2 with the fully inserted U-lock, during attachment of the secondary strap for attaching a distal portion of the U-lock to the bicycle frame.
Figure 10:
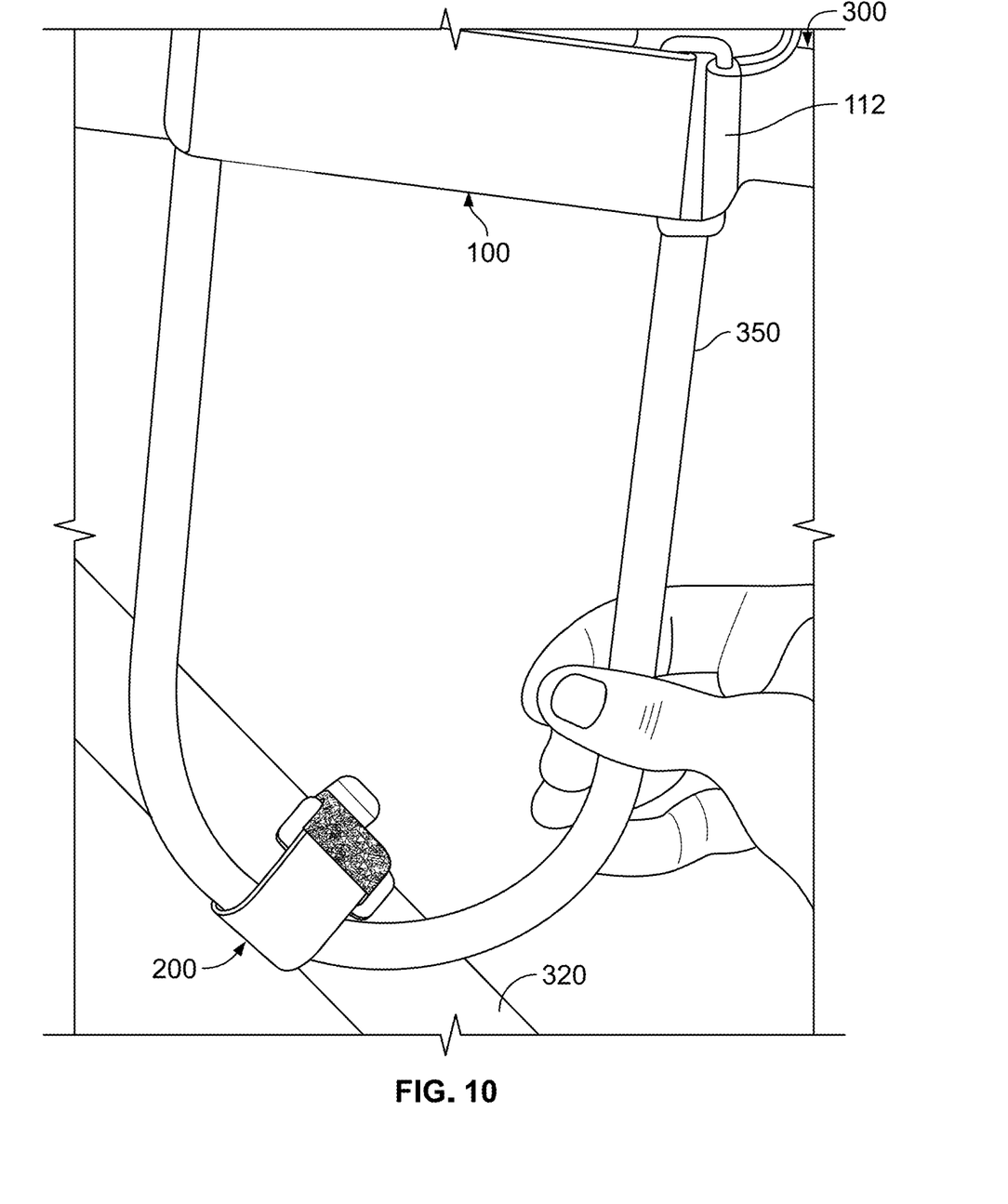
FIG. 10 is a line rendering of a photo illustrating the apparatus of FIGS. 1-2 with the fully inserted U-lock, after attachment of the secondary strap securing the U-lock to the bicycle frame.

FIG. 8 shows the U-lock 350 fully inserted into the loop of the main strap 110 while the user 360 presses the hook piece 122 against the loop piece 120 to secure the U-lock in place. In the depicted configuration, gravity helps keep the U-lock in place in addition to frictional forces exerted by the main strap 110, because the upper bar of the U-lock is too large to pass through the loop of the main strap 110 under gravity. The U-lock is otherwise free to move unless secured to the frame at another point. FIG. 9 shows the user 360 attaching the U-lock 350 to a lower bar 208 of the bike frame 300, using the additional strap 200. The end of the strap 200 comprising the hook piece 204 is passed through the rectangular ring 208 and pulled back to tension the strap as shown in FIG. 8. Then, the user secures the hook piece 204 to the loop piece 202, resulting in the secured U-lock 350 as shown in FIG. 10. The U-lock thus secured by the main strap 110 and additional strap 200 will not move during transit but can easily be removed and used to lock the bike once the rider reaches their destination. The user can easily remove both lightweight strap assemblies 100, 200 and keep them in a carry bag or the like for the return trip.

Figure 11:
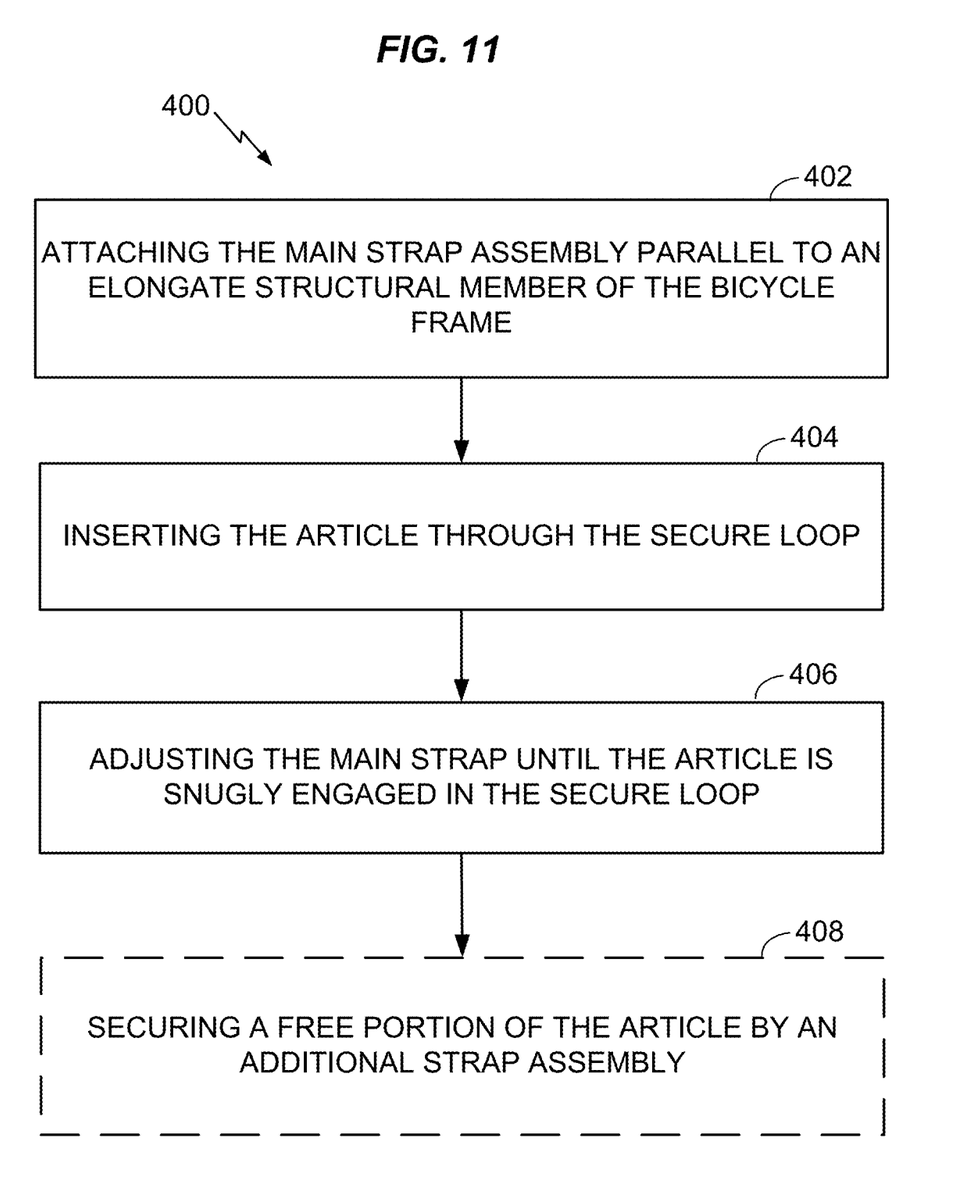
FIG. 11 is a flow chart illustrating operations of a method for attaching a heavy article to a lightweight frame, using an apparatus or system as described herein.

In summary of the foregoing, and by way of further illustration, FIG. 11 illustrates a method 400 for attaching a U-lock or similar article to a bicycle frame, using an apparatus 100 as described above. At 402, the user attaches the main strap to a tubular member of a bike frame by the two ancillary straps. The user may hold the apparatus 100 against the frame, wrap the rubberized webbing of the ancillary straps around the tubular member, pass the distal end of the ancillary straps with the hook piece through the retaining rings and double the hook piece back against the loop piece to secure, as shown in FIG. 5. At 404, the user inserts the U-lock or other article through the loop of the main strap created by inserting the distal end of the strap through its rectangular ring. At 406, the user adjusts the main strap so the U-lock or other article is snugly engaged. Optionally, at 408, the user secures a free portion of the U-lock or other article using the additional strap assembly, as illustrated and described above. Other aspects of the method 400 may be as described elsewhere herein, or may be adapted for different configurations of the apparatus 100 and 200 by one of ordinary skill.

A strapping system that includes the apparatus 100 and optionally the apparatus 200 is lightweight, durable, compact, and securely holds the U-lock positioned in a manner that will not interfere with normal operation of a bicycle. It requires no tools for assembly nor attachment of brackets or hard pieces to the bicycle frame. The system can be included as one component of a mobile transport, maintenance, storage or other bicycle system. In one embodiment, that system can include a first compartment positioned on and hanging from the horizontal first strap to hold other items of smaller size or other objects that might otherwise fall through when adjusting the assembly or during transit. Such smaller size or other objects may include, for example, a repair kit, wallet and glasses.

The innovation described above is only one exemplary embodiment of the invention which also may have uses in other applications, including without limitation: any applications that may benefit from extra storage such as strapping the apparatus to a bicycle and thereby providing means to carry a U-lock, cable lock, water bottle, bicycle pump, tools or other items that need to be transported or stored with the bicycle; strapping the apparatus to a motorcycle in order to carry a lock or other item; and attaching the apparatus to essentially any type of support that needs additional storage capacity during the normal operation, maintenance or storage of a bicycle or other object. Similarly, the number and dimensions of the straps can vary depending upon the number, size or dimensions of the objects one needs to support with the apparatus as well as where or when that support may be necessary or practicable.

The advantages of the invention include, for example, the adjustability of the fastening loop of the main strap 110 which provides the means to attach the holster to multiple locations on, and sizes of, the frame, and adjustability of the loop's size providing means to accommodate a variety of sizes and types/designs of U-locks or other types of equipment.

While several illustrative embodiments of the invention have been disclosed herein, still further variations and alternative embodiments will occur to those skilled in the art. The size or dimensions of the holster, for example, can vary according to the size, dimensions, or type of equipment it can support, including without limitation U-locks, cable locks, bicycle pumps, tools and the like. Buckles or other releasable engagement mechanisms can be substituted for the rectangular rings, the rubberized webbing may be omitted for lighter weight or lower cost, and fasteners other than hook-and-loop may be used to secure the straps to themselves, for example. Similarly, the apparatus can be used to store articles to other tubular or elongated structures wherever such storage is needed and not just on bicycles. Such variations and alternative embodiments are contemplated, and can be made without departing from the spirit and scope of the invention as defined in the appended claim.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An apparatus for securing a U-lock to a bicycle frame, comprising:
a main strap assembly for holding a U-lock and attaching to a bicycle frame, the assembly comprising an elongate webbing having at least three distinct portions configured for forming a secure loop by releasable adhesion of at least one of the portions to another of the portions, wherein the at least three distinct portions comprise a proximal portion, an intermediate portion and a distal portion, in which the proximal portion comprises a rubberized surface oriented towards a back side of the main strap assembly, the intermediate portion comprises a first adhesive material oriented towards the back side, and the distal portion comprises a second adhesive material oriented towards the back side for adhesion to the first adhesive material, such that when the elongate webbing is formed into the secure loop the rubberized surface faces radially outward and an interior of the secure loop is substantially free of the rubberized surface and is sized to fit around parallel bars of the U-lock; and
a pair of parallel ancillary strap assemblies attached transversely to the main strap assembly, each of the pair attached to a respective one of ancillary releasable engagement mechanisms at an end thereof.

2. The apparatus of claim 1, further comprising a main releasable engagement mechanism attached to the main strap assembly at an end of the proximal portion.

3. The apparatus of claim 2, wherein the main releasable engagement mechanism comprises a ring.

4. The apparatus of claim 1, wherein the first adhesive material comprises a loop material for hook-and-loop engagement with the second adhesive material which comprises a hook material.

5. The apparatus of claim 1, wherein the proximal portion comprises a rubberized webbing having the rubberized surface.

6. The apparatus of claim 1, wherein the elongate webbing is free of releasable adhesive materials on a front side of the main strap assembly opposite to the back side.

7. The apparatus of claim 4, wherein the elongate webbing is stitched to any one or more of: the loop material or the hook material.

8. The apparatus of claim 5, wherein the elongate webbing is stitched to the rubberized webbing.

9. The apparatus of claim 1, wherein each of the three distinct portions is of equivalent length.

10. The apparatus of claim 1, wherein the ancillary releasable engagement mechanisms each comprise a ring.

11. The apparatus of claim 10, wherein each of the pair of parallel ancillary strap assemblies comprises a proximal portion attached to the ring and a distal portion distinct from the proximal portion.

12. The apparatus of claim 11, wherein the proximal portion comprises a piece of loop material and the distal portion comprises a piece of hook material.

13. The apparatus of claim 12, wherein each of the pair of parallel ancillary strap assemblies is oriented with the engagement side of the piece of loop material and the engagement side of the piece of hook material oriented toward a front side of the main strap assembly.

14. The apparatus of claim 12, wherein each of the proximal portion and the distal portion are of equivalent length.

15. The apparatus of claim 1, wherein the elongate webbing is free of rubberized materials on a front side of the main strap assembly opposite to the back side.

16. The apparatus of claim 1, wherein each of the pair of parallel ancillary strap assemblies comprises a rubberized surface oriented towards the back side of the main strap assembly.

* * * * *